May 18, 1926.
H. B. MYERS
WATER IMPOUNDING SYSTEM
Filed Feb. 6, 1926   3 Sheets-Sheet 1
1,585,409
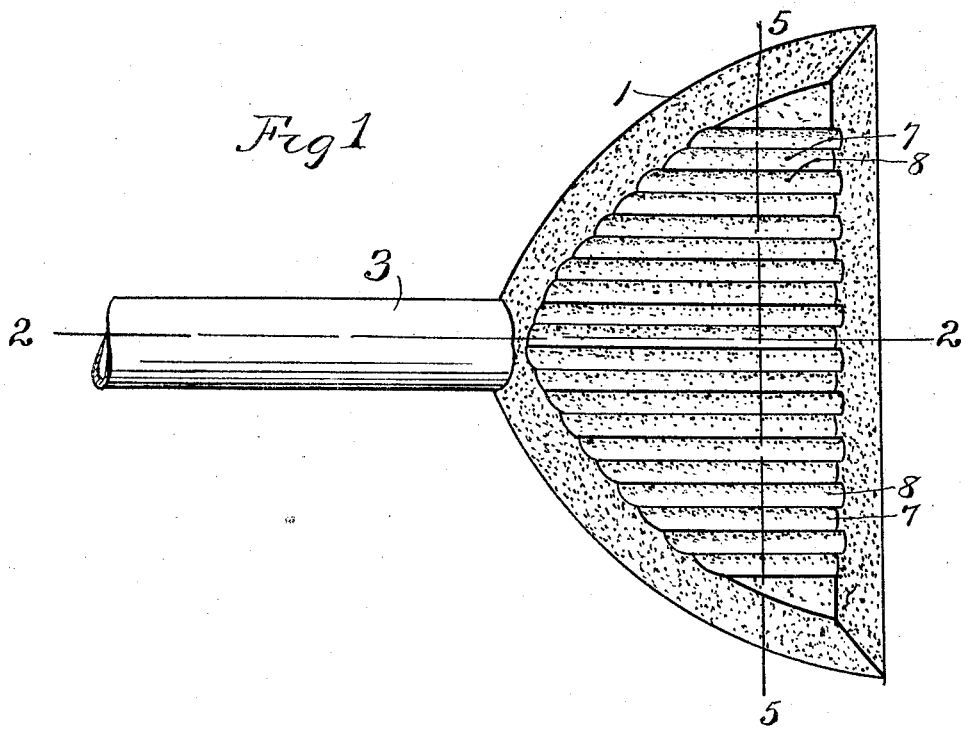
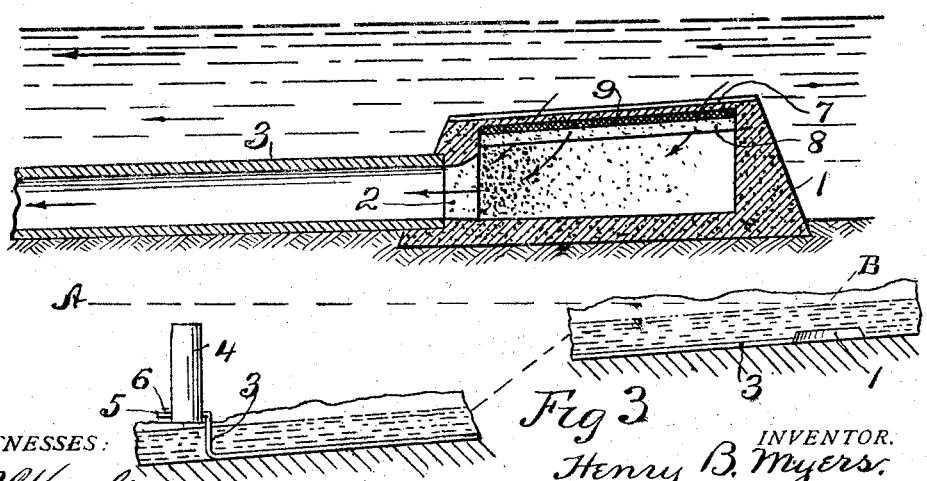
WITNESSES:
INVENTOR.
Henry B. Myers,
BY Warren D. House
His ATTORNEY May 18, 1926.

H. B. MYERS 1,585,409

WATER IMPOUNDING SYSTEM

Filed Feb. 6, 1926   3 Sheets-Sheet 2

WITNESSES:
R. E. Hamilton

INVENTOR.
Henry B. Myers.
BY Warren W. House,
His ATTORNEY

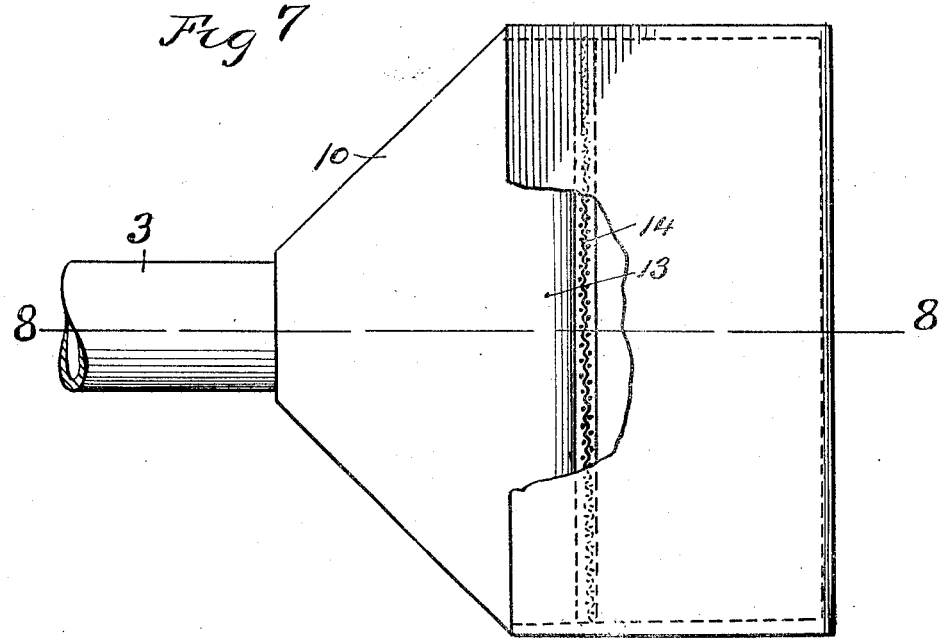
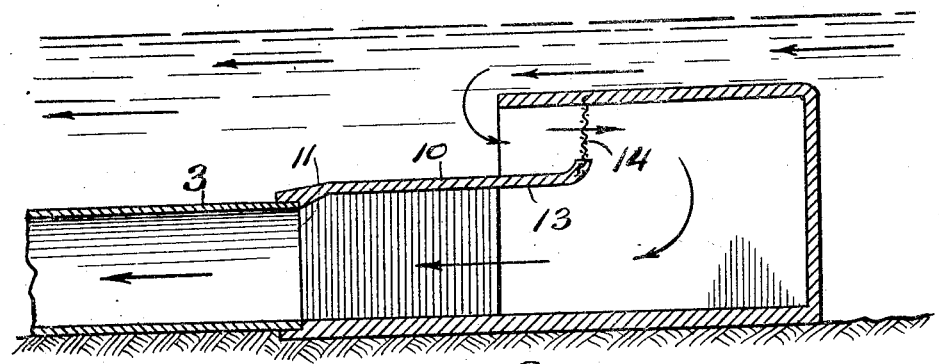

Patented May 18, 1926.

1,585,409

UNITED STATES PATENT OFFICE.

HENRY B. MYERS, OF KANSAS CITY, MISSOURI.

WATER-IMPOUNDING SYSTEM.

Application filed February 6, 1926. Serial No. 86,606.

My invention relates to improvements in water impounding systems. It relates particularly to the impounding of waters of such streams as rivers or brooks.

One of the objects of my invention is to provide novel means for the impounding of waters of streams by means of which the water impounded may be utilized for drinking, irrigation, power or other purposes, with no expense for operation, relatively small expense for installation, and, if desired, without damming of the stream to the extent of causing undesired flooding of land.

A further object of my invention is to provide a novel water impounding system, which is simple, strong, durable, not liable to get out of order or to be damaged by the stream or weather conditions, which is automatic in operation, and which provides increased power with the increased distance that the impounded water is carried.

The novel features of my invention are hereinafter fully described and claimed.

In the accompanying drawings, which illustrate my invention,

Fig. 1 is a top view of the reservoir and part of the flow line conduit of the preferred embodiment of my improved system.

Fig. 2 is a vertical section of the same on the line 2—2 of Fig. 1, the reservoir and conduit being shown submerged in a stream.

Fig. 3 is a reduced elevation, partly broken away, of the form of apparatus constituting the preferred embodiment of my invention.

Fig. 7 is a top view, partly broken away, of a modified form of reservoir of my invention, and a part of the flow line conduit.

Fig. 8 is a section on the line 8—8 of Fig. 7, the reservoir and conduit being shown disposed in a stream.

Similar reference characters designate similar parts in the different views.

Figure 4:
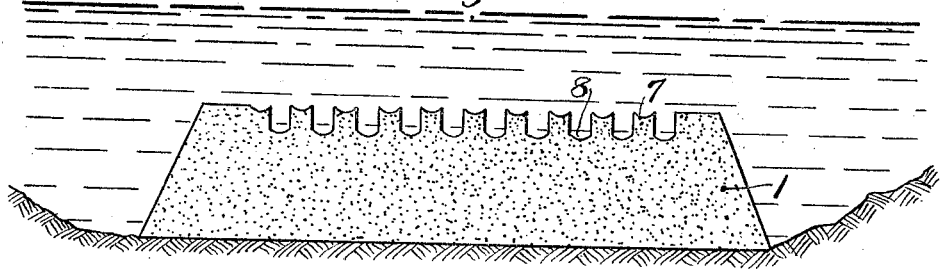
Fig. 4 is an up stream side elevation of what is shown in Fig. 2.
Figure 5:
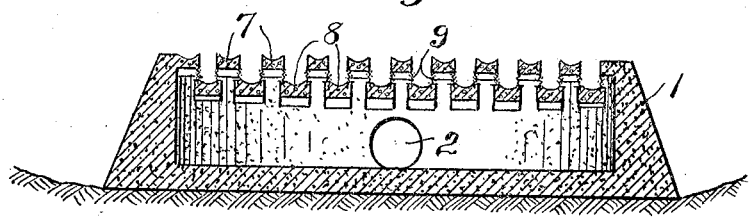
Fig. 5 is a reduced cross section on the line 5—5 of Fig. 1.
Figure 6:
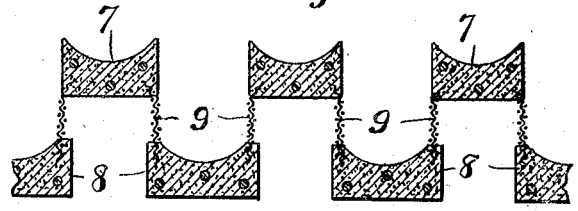
Fig. 6 is an enlarged cross section through some of the bars forming the top of the reservoir shown in Fig. 1.

Referring to Figs. 1 to 6, 1 designates the body of my improved reservoir, which, as shown in Fig. 4 and Fig. 5, may be of a cross stream length, and of such height, as to serve the function of a dam for raising the height of the water, but permitting the water to flow over the top thereof. The body of the reservoir, or dam, is hollow, the lower side of the reservoir having an outlet 2, with which is connected a flow line conduit 3. The body 1 and the conduit 3 rest on the bed of the stream, and the conduit 3 leads down the stream on the bed thereof to the point where the water impounded is to be stored or used. The discharge end of the conduit 3 is below the level of the surface of the water which is over the reservoir 1.

The discharge end of the conduit 3 may be connected to a storage tank 4 which is above the surface of the water at the discharge end of the conduit 3. The tank 4 may have near its lower end a discharge pipe 5 having a shut off valve 6. The water withdrawn from the pipe 5 will have a pressure corresponding approximately to a column of water having a height corresponding to the distance from the pipe 5 to the level, indicated by the line A—B in Fig. 3, of the surface of the water over the reservoir 1.

The outer walls of the body 1 preferably have a batter to impart great resistance to the thrust of the stream, and the inner side walls, preferably converge to the outlet 2, Fig. 1.

For providing an intake for water, the top of the reservoir is provided with openings. To provide such openings, there are provided an upper tier of spaced apart longitudinal bars 7, which incline down stream and are, preferably, channel bars which have the channels upwardly facing.

Below the bars 7, and having staggered relation thereto, and spaced therefrom, is a lower tier of bars 8, arranged parallel with and being channel bars similar to and disposed similarly to the disposition of the bars 7.

The channels in the top of the body 1 extend, as shown in Figures 1 and 2, the full up and down stream width of the top of the body, so that dirt, silt, pebbles, etc., entering such passages will pass clear of the body at the lower side thereof.

Water entering the channel passages between the bars 7 and 8 will pass between the bars to the interior of the reservoir, from which the water, thus impounded, will flow through the conduit 3 and into the tank 4, from which it may be withdrawn for use, as desired.

To keep trash, sticks and dirt settling in or passing along in the channels of the bars 7 and 8, from entering the reservoir chamber below the bars, screening means may be provided between the bars 7 and the bars 8. Such screening may comprise vertical strips of longitudinally disposed screen wire 9, Figs. 2, 5 and 6, arranged at opposite sides of the spaces between the bars 7 and 8, and having their lower edges embedded in the bars 8, and their upper edges embedded in the bars 7. The screen strips 9 extend the full length of the bars 7 and 8.

The body 1, bars 7 and 8 and conduit 3 may be composed of any suitable material. In the drawings, the body 1 and bars 7 and 8 are shown as being re-enforced concrete. The flow line conduit 3 may also be made of cementitious material or of steel or cast iron, as desired.

In the operation of this form of my invention, as shown in Fig. 2, as indicated by the arrows, the water enters the reservoir chamber between the bars 7 and 8 and passes into the conduit 3 through the outlet 2. Dirt and material which is kept out of the chamber by the screen strips 9 pass through the channels and are discharged from the lower ends of the same.

In the modified form of my invention, shown in Figs. 7 and 8, 10 designates a reservoir body having inner side walls which converge to an outlet 11 which discharges into a flow line conduit 3, similar to the one already described. The lower side of the body 10 has an opening 12, and an inwardly extending lip 13 under said opening. The opening 12 serves as a water intake, and across it is a vertical screen 14, the lower edge of which is fastened in any suitable manner to the lip 13, and the upper edge of which is fastened in a desired manner to the under side of the top of the body 10.

The reservoir body 10 and the conduit 2 are disposed in the bed of the stream in which they are submerged, as shown in Fig. 8. The water enters the reservoir chamber through the intake openings 12, passes over and downwardly with respect to the lip 13 and is discharged through the outlet 11 into the flow line conduit 2. The screen 14 arrests and prevents the entrance into the reservoir chamber of such things as will not pass through it, such as stones, sticks and chunks of dirt.

The body 10 may be of any desired material, such as concrete, steel or cast iron.

By submerging the reservoir 1 or 10 as the case may be, the stream is permitted to flow over it, and it may be of such dimension, both as to height and cross stream width, as not to materially raise the level of the water above it, and such as will serve to impound the desired amount of water.

By laying the flow line conduit 2 along on the bed of the stream, an already graded support is afforded, and there is no liability of leakage to the extent that may occur with flow lines laid in the ground, furthermore there is no danger of freezing when the flow line is in a stream that does not freeze to the bottom. The pressure obtained in the storage tank is, of course, dependent upon the fall of the ground through which the stream travels. The greater fall there is in the stream, and the greater the distance the tank is from the reservoir, the greater will be the pressure in the tank.

I do not limit my invention to the structures shown and described, as many modifications, within the scope of the appended claims, may be made without departing from the spirit of my invention.

What I claim is:—

1. In a water impounding system, a reservoir submerged in a stream and having an outlet and provided with a top comprising longitudinal spaced apart channel bars inclining down stream.

2. In a water impounding system, a reservoir submerged in a stream and having an outlet and provided with a top comprising two tiers of spaced apart channel bars inclining down stream, the bars of one tier being below and spaced from the bars of the upper tier and disposed respectively in the vertical planes of the spaces between the bars of the upper tier.

3. In a water impounding system, a reservoir submerged in a stream and having an outlet and provided with a top comprising two tiers of spaced apart channel bars inclining down stream, the bars of one tier being below and spaced from the bars of the upper tier and disposed respectively in the vertical planes of the spaces between the bars of the upper tier, the channels in the top extending the full up and down stream width thereof.

4. In a water impounding system, a reservoir submerged in a stream and having an outlet and provided with a top comprising two tiers of spaced apart channel bars inclining down stream, the bars of one tier being below and spaced from the bars of the upper tier and respectively in the planes of the spaces between the bars of the upper tier, screening means connecting the lower bars with the upper bars and extending the length thereof.

5. In a water impounding system, a reservoir submerged in a stream and having an outlet and provided with a top comprising two tiers of spaced apart channel bars inclining down stream, the bars of one tier being below and spaced from and disposed in staggered relation to the bars of the upper tier, screening strips at opposite sides respectively of the spaces between said bars and between the bars of the upper and lower tiers.

In testimony whereof I have signed my name to this specification.

HENRY B. MYERS.